US012651576B2

(12) United States Patent
Lee et al.

(10) Patent No.: US 12,651,576 B2
(45) Date of Patent: Jun. 9, 2026

(54) SCAN DRIVER CAPABLE OF SELECTIVE SCAN DRIVING AND DISPLAY DEVICE INCLUDING SAME

(71) Applicant: UNIVERSITY-INDUSTRY COOPERATION GROUP OF KYUNG HEE UNIVERSITY, Yongin-si (KR)

(72) Inventors: Seung Woo Lee, Seoul (KR); Jae Hee Jo, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 26 days.

(21) Appl. No.: 18/833,664

(22) PCT Filed: Jan. 19, 2023

(86) PCT No.: PCT/KR2023/000963

§ 371 (c)(1),
(2) Date: Feb. 12, 2025

(87) PCT Pub. No.: WO2023/146218

PCT Pub. Date: Aug. 3, 2023

(65) Prior Publication Data

US 2025/0384839 A1 Dec. 18, 2025

(30) Foreign Application Priority Data

Jan. 28, 2022 (KR) ........................ 10-2022-0013420

(51) Int. Cl.
*G09G 3/32* (2016.01)
*G09G 3/3266* (2016.01)

(52) U.S. Cl.
CPC ... *G09G 3/3266* (2013.01); *G09G 2310/0286* (2013.01); *G09G 2310/04* (2013.01);
(Continued)

(58) Field of Classification Search
CPC ......... G09G 3/3266; G09G 2310/0286; G09G 2310/04; G09G 2320/08; G09G 2330/023; G09G 2340/0435
See application file for complete search history.

(56) References Cited

U.S. PATENT DOCUMENTS

2021/0201832 A1* 7/2021 Lim ..................... G09G 3/3266

FOREIGN PATENT DOCUMENTS

KR 10-2001-0106173 A 11/2001
KR 10-2013-0062011 A 6/2013
(Continued)

OTHER PUBLICATIONS

International Search Report of PCT/KR2023/000963 dated Apr. 24, 2023 [PCT/ISA/210].

*Primary Examiner* — Michael A Faragalla
(74) *Attorney, Agent, or Firm* — Sughrue Mion, PLLC

(57) ABSTRACT

A scan driver of a display device includes a plurality of stages. Each stage includes: a scan unit which includes a plurality of scan transistors and outputs a scan signal for driving a scan line using the plurality of scan transistors; and a memory unit which receives a start signal, a data voltage, and a scan control signal, and selectively outputs, to the scan unit, at least one among the start signal and the data voltage as a scan start signal. The start signal may include an initial start signal and a scan signal of a previous stage. In a programming mode, the memory unit outputs the start signal to the scan unit as the scan start signal, and in a selective
(Continued)

scan driving mode, does not output the start signal and outputs the data voltage to the scan unit as the scan start signal.

14 Claims, 9 Drawing Sheets

(52) U.S. Cl.
CPC ... *G09G 2320/08* (2013.01); *G09G 2330/023* (2013.01); *G09G 2340/0435* (2013.01)

(56) References Cited

FOREIGN PATENT DOCUMENTS

| | | | |
|---|---|---|---|
| KR | 10-1965079 | B1 | 4/2019 |
| KR | 10-2019-0083393 | A | 7/2019 |
| KR | 10-2021-0078622 | A | 6/2021 |
| KR | 10-2291634 | B1 | 8/2021 |
| KR | 10-2022-0002776 | A | 1/2022 |

* cited by examiner

SCAN DRIVER CAPABLE OF SELECTIVE SCAN DRIVING AND DISPLAY DEVICE INCLUDING SAME

CROSS REFERENCE TO RELATED APPLICATIONS

This application is a National Stage of International Application No. PCT/KR2023/000963 filed on Jan. 19, 2023, claiming priority based on Korean Patent Application No. 10-2022-0013420 filed on Jan. 28, 2022.

TECHNICAL FIELD

The present invention relates to a scan driver, and more particularly, to a scan driver that enables selective scan driving and a display device including the scan driver that enables selective scan driving.

RELATED ART

Currently, there is a need to reduce power consumption of a display device and, particularly, there is a need to reduce power consumption of the display device in a mobile device such as a smartphone and a tablet computer. To reduce the power consumption of the display device, low frequency driving technology for driving or refreshing a display panel at a lower driving frequency than a general driving frequency is developed.

For example, when displaying a still image, such as a notification window at the top, a screen is refreshed at 10 Hz, and when displaying a video, such as sports broadcast, the screen is refreshed at a high frame rate of 120 Hz. Using this method, unnecessary power consumption may be reduced, which may lead to significantly increasing an operating time of the display device.

In a conventional display device to which such low frequency driving technology is applied, when the still image is not displayed in the entire region of the display panel, that is, when the still image is displayed only in a partial region of the display panel, the entire region of the display panel is driven at an input driving frequency. That is, in this case, since scanning needs to be performed sequentially from a first stage to a last stage at all times, a frame rate may not be partially adjusted.

For example, when a video is displayed only in a small region at the center of the screen and the rest is a fixed image, the existing technology needs to drive the entire display region at a high frame rate to match the video. Therefore, in the conventional display device, there is a limit in reducing power consumption since partial low frequency driving is impossible.

This work was supported by the Technology Innovation Program (20016317, Integrated Driving Circuit and Driving System Technology for 1270 ppi LowPower OLED Display Based on Oxide Semiconductor) funded By the Ministry of Trade, Industry & Energy (MOTIE, Korea).

DETAILED DESCRIPTION

Technical Subject

An objective of the present invention is to provide a scan driver that may provide a plurality of scan signals to a plurality of pixel rows at different driving frequencies in a selective scan driving mode.

Another objective of the present invention is to provide a display device that includes the scan driver.

However, the subject to be solved by the present invention is not limited to the aforementioned subject and may be variously expanded without departing from the spirit and scope of the present invention.

Solution

To achieve one objective of the present invention, a scan driver according to example embodiments of the present invention may include a plurality of stages. Each stage may include a scan unit including a plurality of scan transistors and configured to output a scan signal of driving a scan line using the plurality of scan transistors; and a memory unit configured to receive a start signal, a data voltage, and a scan control signal, and to selectively output at least one of the start signal and the data voltage to the scan unit as a scan start signal. The start signal may include an initial start signal and a scan signal of a previous stage. The memory unit may be configured to output the start signal to the scan unit as the scan start signal in a programming mode, and to output the data voltage to the scan unit as the scan start signal without outputting the start signal in a selective scan driving mode.

In an example embodiment, the memory unit may include a first memory transistor including a gate electrode connected to a first node to which the start signal is applied, a source electrode connected to a second node to which the data voltage is applied, and a drain electrode connected to a third node; a second memory transistor including a gate electrode connected to the third node, a source electrode connected to the second node, and a drain electrode connected to a fourth node; and a third memory transistor including a gate electrode to which the scan control signal is applied, a source electrode connected to the first node, and a drain electrode connected to the fourth node.

In an example embodiment, the scan unit may be configured to receive the scan start signal through the fourth node.

In an example embodiment, the memory unit may further include a memory capacitor including a first electrode connected to the third node and a second electrode connected to a fifth node to which a low level voltage of the scan unit is applied.

In an example embodiment, the first memory transistor, the second memory transistor, and the third memory transistor may be n-MOS transistors.

In an example embodiment, in the programming mode, the start signal may have a logic high level during a first period, the scan control signal may be maintained at the logic high level, and image data may be updated during all sections.

In an example embodiment, in the selective scan driving mode, the start signal may have a logic low level during all sections, and image data may be held in a low frame rate driving region and updated in a high frame rate driving region.

In an example embodiment, in the selective scan driving mode, the scan control signal may have the logic low level in a section immediately preceding the high frame rate driving region and a last section of the high frame rate driving region.

In an example embodiment, the scan unit may include a Q node connected to the fourth node through at least one scan transistor.

In an example embodiment, the Q node may be reset using at least one of the second memory transistor and the third memory transistor.

In an example embodiment, the memory unit may include a first memory transistor including a gate electrode connected to a first node to which the start signal is applied, a source electrode connected to a second node to which the data voltage is applied, and a drain electrode connected to a (3-1)-th node; a second memory transistor including a gate electrode connected to a (3-2)-th node, a source electrode connected to the second node, and a drain electrode connected to a fourth node; a third memory transistor including a gate electrode to which the scan control signal is applied, a source electrode connected to the first node, and a drain electrode connected to the fourth node; and a fourth memory transistor including a gate electrode to which a memory control signal is applied, a source electrode connected to the (3-1)-th node, and a drain electrode connected to the (3-2)-th node.

In an example embodiment, the memory unit may further include a memory capacitor including a first electrode connected to the (3-2)-th node and a second electrode connected to a fifth node to which a low level voltage of the scan unit is applied.

In an example embodiment, the first memory transistor, the second memory transistor, and the third memory transistor may be p-MOS transistors, and the fourth memory transistor may be an n-MOS transistor.

In an example embodiment, a memory control signal may turn on the fourth memory transistor by maintaining at a logic high level in the programming mode and may control the fourth memory transistor by changing a logic level in the selective scan driving mode.

To achieve another objective of the present invention, a display device according to example embodiments of the present invention may include a display panel including a plurality of pixel rows; a data driver configured to provide data signals to each of the plurality of pixel rows; a scan driver configured to provide a plurality of scan signals to the plurality of pixel rows, respectively; and a controller configured to control the data driver and the scan driver. The scan driver may include a plurality of stages. Each stage may include a scan unit including a plurality of scan transistors and configured to output a scan signal of driving a scan line using the plurality of scan transistors; and a memory unit configured to receive a start signal, a data voltage, and a scan control signal, and to selectively output at least one of the start signal and the data voltage to the scan unit as a scan start signal. The start signal may include an initial start signal and a scan signal of a previous stage. The memory unit may be configured to output the start signal to the scan unit as the scan start signal in a programming mode, and to output the data voltage to the scan unit as the scan start signal without outputting the start signal in a selective scan driving mode.

Effect

A scan driver according to example embodiments of the present invention may control a programming mode and a selective scan driving mode in a memory unit such that a display region driven at a high frame rate may update image data and a display region driven at a low frame rate may maintain the image data.

Therefore, the scan driver may reduce power consumed by a display device by minimizing unnecessary update of the image data.

Also, the scan driver may minimize a circuit area for reducing power consumption by providing a memory unit to an input terminal of the scan unit rather than an output terminal of the scan unit.

However, the effect of the present invention is not limited to the aforementioned effect and may be variously expanded without departing from the spirit and scope of the present invention.

BEST MODE

Figure 1:
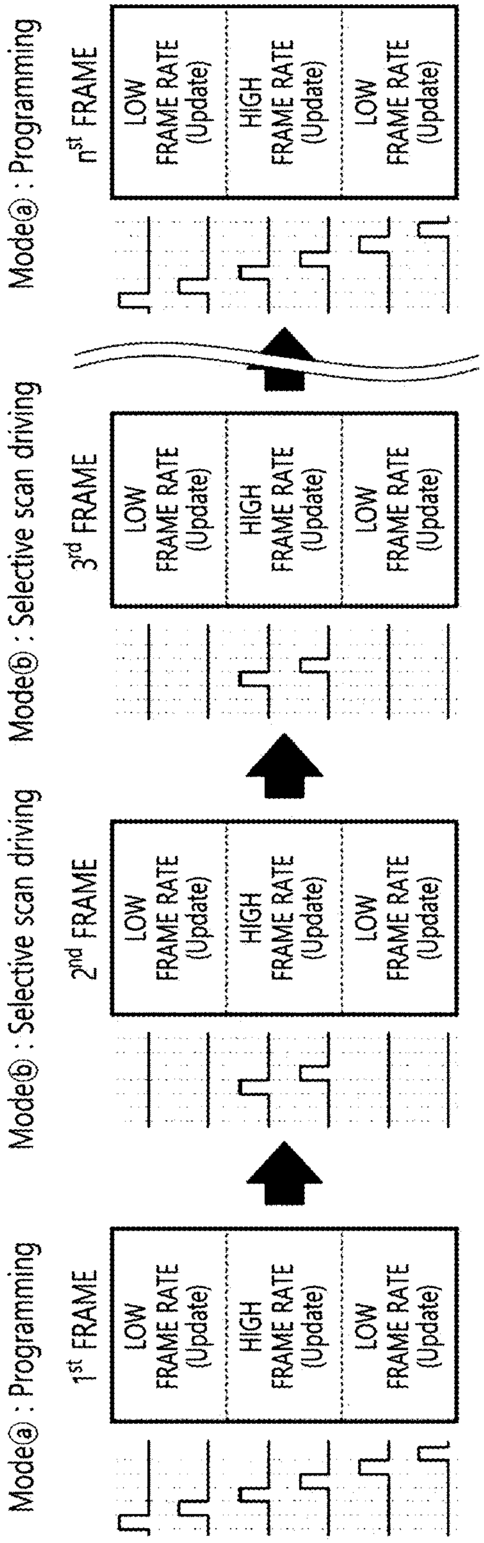
FIG. 1 is a conceptual diagram illustrating selective scan driving of a scan driver according to example embodiments of the present invention.

The following structural or functional descriptions of example embodiments according to the concept of the present invention disclosed herein are merely intended for the purpose of describing the example embodiments according to the concept of the present invention and the example embodiments according to the concept of the present invention may be implemented in various forms and are not construed as limited to the example embodiments described herein.

Various modifications and various forms may be made to the example embodiments according to the concept of the present invention and thus, the example embodiments are illustrated in the drawings and the present specification is described in detail. However, it should be understood that the example embodiments according to the concept of the present invention are not construed as limited to specific implementations and should be understood to include all changes, equivalents, and replacements within the idea and the technical scope of the present invention.

Although terms of "first," "second," and the like are used to explain various components, the components are not limited to such terms. These terms are used only to distinguish one component from another component. For example, a first component may be referred to as a second component, or similarly, the second component may be referred to as the first component without departing from the scope according to the concept of the present invention.

When it is mentioned that one component is "connected" or "accessed" to another component, it may be understood that the one component is directly connected or accessed to another component or that still other component is interposed between the two components. In addition, when it is described that one component is "directly connected" or "directly accessed" to another component, it should be understood that still other component is absent therebetween. Likewise, expressions, for example, "between" and "immediately between" and "immediately adjacent to" may also be construed as described in the foregoing.

The terminology used herein is for the purpose of describing particular example embodiments only and is not to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, stages, operations, elements, components or combinations thereof, but do not preclude the presence or addition of one or more other features, integers, stages, operations, elements, components, or combinations thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. However, the scope of the claims is not limited to or restricted by the example embodiments. Like reference numerals presented in the respective drawings refer to like components throughout.

FIG. 1 is a conceptual diagram illustrating selective scan driving of a scan driver according to example embodiments of the present invention.

Referring to FIG. 1, the scan driver may operate in at least one mode of a programming mode and a selective scan driving mode.

The programming mode may update image data (DATA) by generating a scan signal of the scan driver in all regions. For example, the programming mode may be a mode for displaying video or image driven at a high frame rate of 30 Hz or more (e.g., 120 Hz).

The selective scan driving mode may update image data (DATA) by generating the scan signal of the scan driver only in some regions and may maintain (or hold) image data (DATA) without generating the scan signal of the scan driver in remaining regions.

For example, some regions in which the image data (DATA) is updated in the selective scan driving mode may be a region for displaying video or image driven at a high frame rate of 30 Hz or more (e.g., 120 Hz).

For example, remaining regions in which the image data (DATA) is held in the selective scan driving mode may be a region for displaying a still image driven at a low frame rate of less than 30 Hz (e.g., 10 Hz).

As shown in FIG. 1, each frame may be driven in at least one of the programming mode and the selective scan driving mode.

In the selective scan driving mode, a scan operation may be performed from an arbitrary stage.

For example, a first frame may be driven in the programming mode, a second frame and a third frame may be driven in the selective scan driving mode, and an n-th frame may be driven again in the programming mode.

Here, for the second frame and the third frame, a portion of a display region may be driven at a high frame rate and the rest of the display region may be driven at a low frame rate.

In the display area driven at the low frame rate, a frame rate may be determined according to the number of drives of the selective scan driving mode.

Figure 2:
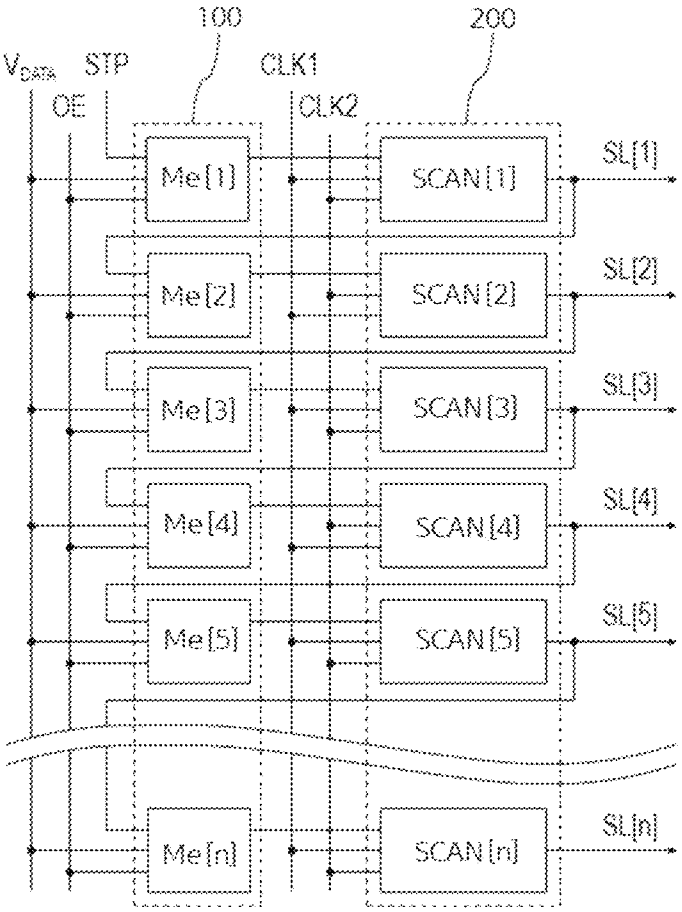
FIG. 2 is a block diagram illustrating a configuration of a scan driver according to an example embodiment of the present invention.

FIG. 2 is a block diagram illustrating a configuration of a scan driver according to an example embodiment of the present invention.

Referring to FIG. 2, the scan driver according to example embodiments of the present invention may include a plurality of stages.

Each stage may include a scan unit 200 and a memory unit 100.

The scan unit 200 may include a plurality of scan transistors, and may output a scan signal of driving a scan line using the plurality of scan transistors.

For example, the scan unit 200 may receive a scan start signal, a first clock signal, and a second clock signal, and may sequentially output the scan signal to the scan line using the plurality of scan transistors The memory unit 100 may receive a start signal (STP or SL[n−1]), a data voltage (VDATA), and a scan control signal (OE), and may output a scan start signal to the scan unit 200 using the plurality of memory transistors.

The start signal may include an initial start signal (STP) and a scan signal (SL[n−1]) of a previous stage.

For example, the memory unit 100 may selectively output at least one of the start signal (STP or SL[n−1]) and the data voltage (VDATA) to the scan unit 200 as a scan start signal.

In the programming mode, the memory unit 100 may output the start signal (STP or SL[n−1]) to the scan unit 200 as the scan start signal.

For example, in the programming mode, the memory unit 100 may output the initial start signal (STP) to the scan unit 200 in a first stage and may output the scan signal (SL[n−1]) of the previous stage to the scan unit 200 in remaining stages.

In the selective scan driving mode, the memory unit 100 may not output the start signal (STP or SL[n−1]). For example, in the selective scan driving mode, the memory unit 100 may output the data voltage (VDATA) to the scan unit 200 as the scan start signal.

The scan control signal (OE) may control the start signal (STP or SL[n−1]) output to the scan unit 200 in the selective scan driving mode such that one of the start signal (STP or SL[n−1]) and the data voltage (VDATA) may be output to the scan unit 200 as the scan start signal.

Figure 3:
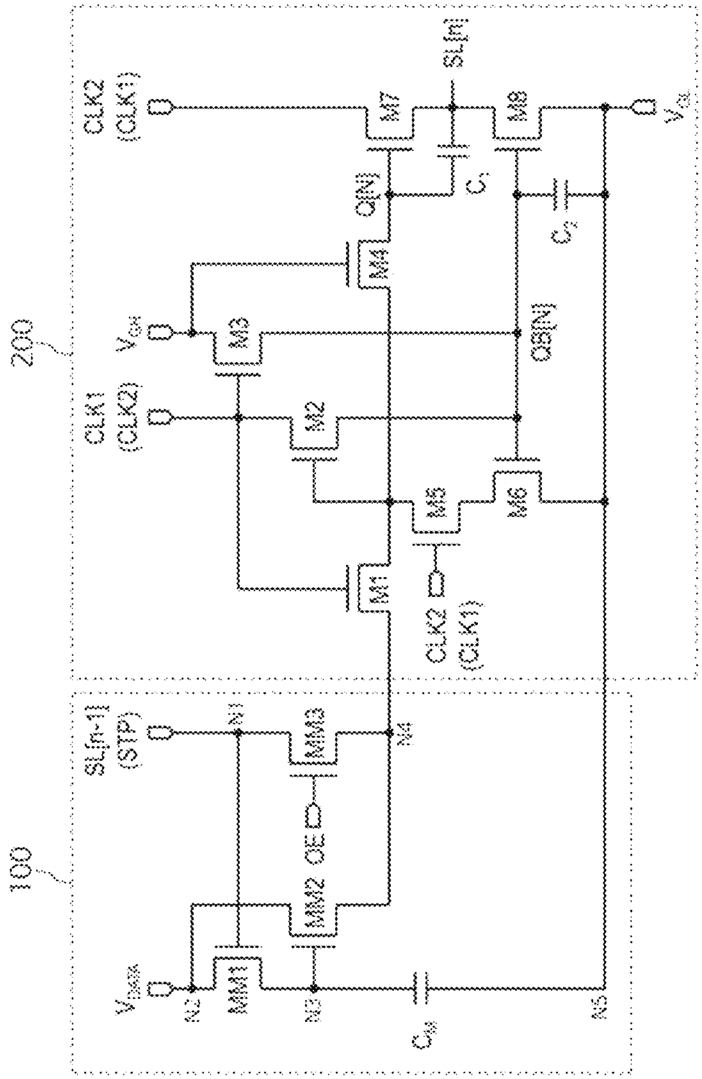
FIG. 3 is a circuit diagram illustrating a memory unit and a scan unit included in each stage of the scan driver of FIG. 2.
Figure 4:
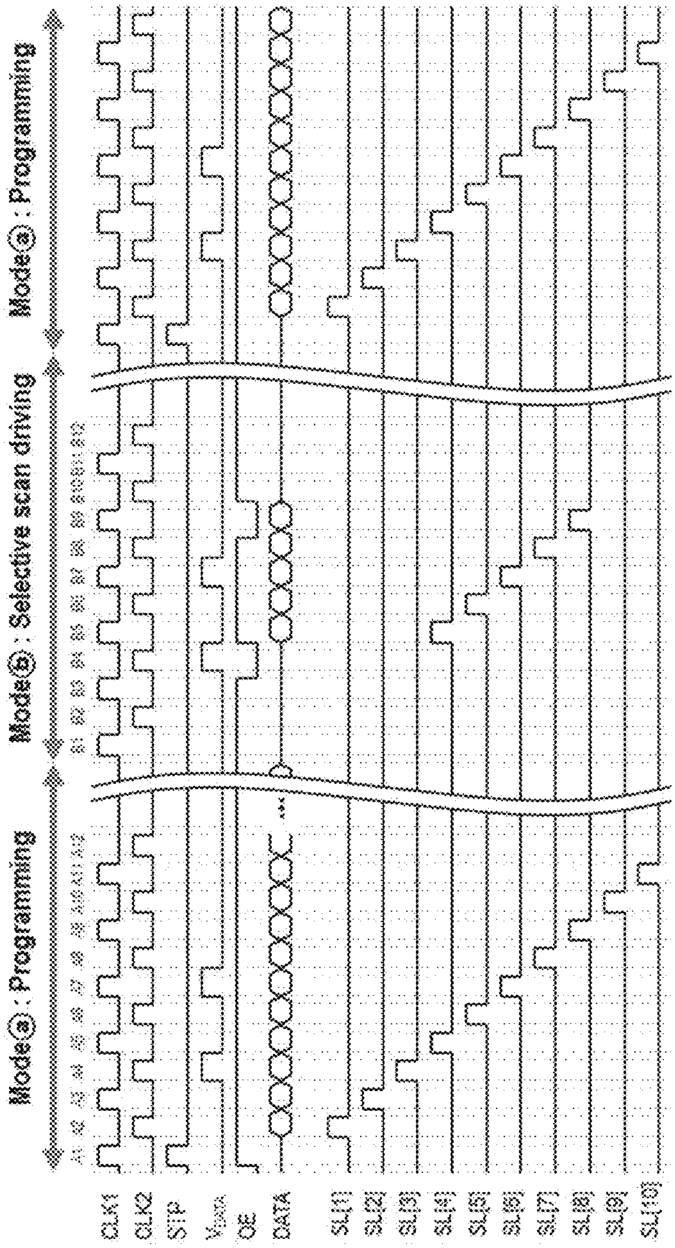
FIG. 4 is a timing diagram for describing an operation of the scan driver of FIG. 2.

FIG. 3 is a circuit diagram illustrating the memory unit 100 and the scan unit 200 included in each stage of the scan driver of FIG. 2, and FIG. 4 is a timing diagram for describing an operation of the scan driver of FIG. 2.

FIG. 3 illustrates an example of a scan driver configured as an N-type.

Referring to FIG. 3, the memory unit 100 may include a first memory transistor (MM1), a second memory transistor (MM2), and a third memory transistor (MM3).

In an example embodiment, the first memory transistor (MM1), the second memory transistor (MM2), and the third memory transistor (MM3) may be n-MOS transistors.

The first memory transistor (MM1) may include a gate electrode connected to a first node (N1) to which the start signal (STP or SL[n−1]) is applied, a source electrode connected to a second node (N2) to which the data voltage (VDATA) is applied, and a drain electrode connected to a third node (N3).

The first memory transistor (MM1) may input the data voltage (VDATA) to the third node (N3) based on the start signal (STP or SL[n−1]).

For example, the third node (N3) may be a memory node in which the data voltage (VDATA) is written.

The second memory transistor (MM2) may include a gate electrode connected to the third node (N3), a source electrode connected to the second node (N2), and a drain electrode connected to a fourth node (N4).

The second memory transistor (MM2) may input the data voltage (VDATA) to the fourth node (N4) based on a level of voltage input to the third node (N3).

The third memory transistor (MM3) may include a gate electrode to which the scan control signal (OE) is applied, a source electrode connected to the first node (N1), and a drain electrode connected to the fourth node (N4).

The third memory transistor (MM3) may input the start signal (STP or SL[n−1]) to the fourth node (N4) based on the scan control signal (OE).

In an example embodiment, the memory unit 100 may further include a memory capacitor. The memory capacitor may include a first node connected to the third node (N3) and a second electrode connected to a fifth node (N5) to which a low level voltage of the scan unit 200 is applied.

The memory capacitor may allow the data voltage (VDATA) to be continuously maintained in the third node (N3). For example, the third node (N3) may be maintained at a constant voltage level in response to the second electrode of the memory capacitor being connected to the fifth node (N5) to which the low level voltage of the scan unit 200 is applied.

The scan unit 200 may receive the scan start signal through the fourth node (N4). That is, the fourth node (N4) may be an input terminal through which the scan start signal is input to the scan unit 200. For example, at least one of the start signal (STP or SL[n−1]) and the data voltage (VDATA) may be input to the scan unit 200 through the fourth node (N4) as the scan start signal.

The scan unit 200 may include a plurality of scan transistors, and may output a scan signal of driving a scan line using the plurality of scan transistors.

FIG. 3 illustrates an example in which the scan unit 200 is configured with first to eighth scan transistors (M1 to M8) and first and second capacitors (C1 and C2), but a configuration of the scan unit 200 according to the present invention is not limited thereto.

For example, unlike the example of FIG. 3, the scan unit 200 may have various configurations of outputting a scan signal of driving a scan line using a plurality of scan transistors.

Referring to FIG. 4, in a programming mode and a selective scan driving mode, a start signal (STP or SL[n−1]), a scan control signal (OE), and a scan signal output to a scan line may have different timings.

For example, in the programming mode and the selective scan driving mode, each of the first memory transistor (MM1), the second memory transistor (MM2), and the third memory transistor (MM3) may be differently controlled.

Therefore, in the programming mode, image data (DATA) may be updated by generating a scan signal of the scan driver in all regions. In the selective scan driving mode, image data (DATA) may be updated by generating the scan signal of the scan driver in some regions and image data (DATA) may be maintained without generating the scan signal of the scan driver in remaining regions.

In the programming mode, the start signal (STP or SL[n−1]) may have a logic high level during a first section, the scan control signal (OE) may be maintained at the logic high level, and the image data (DATA) may be updated in all sections.

For example, in the programming mode, the scan control signal (OE) may be maintained at the logic high level and an initial start signal (STP) or a scan signal (SL[n−1]) of a previous stage may be input to the scan unit 200 through the third memory transistor (MM3).

The start signal (STP or SL[n−1]) may be input as the scan start signal and scan signals may be sequentially output from the first stage (SL[1]) to the last stage (SL[n]). Therefore, data voltage (VDATA) may be written to the third node (N3) (memory node) of each stage to correspond to the scan signal (e.g., SL[1] to SL[n])

In the selective scan driving mode, the start signal (STP or SL[n−1]) may have a logic low level during all sections. For example, in the selective scan driving mode, the start signal (STP or SL[n−1]) may not be output.

In the selective scan driving mode, the scan control signal (OE) may have the logic low level in a section immediately preceding the high frame rate driving region and a last section of the high frame rate driving region.

In the selective scan driving mode, the image data (DATA) may be held in a low frame rate driving region and may be updated in the high frame rate driving region.

At a point in time (e.g., point in time B4) at which change from the low frame rate driving region to the high frame rate driving region is made, the data voltage (VDATA) may be input to the fourth node (N4) through the second memory transistor (MM2). That is, the data voltage (VDATA) may be input to the scan unit 200 through the fourth node (N4) as the scan start signal.

Here, the scan control signal (OE) may have the logic low level in the section immediately preceding the high frame rate driving region and turn on the third memory transistor (MM3), thereby blocking the fourth node (N4) from being connected to the scan signal (SL[n−1]) of the previous stage.

Therefore, the third memory transistor (MM3) may prevent the data voltage (VDATA) as the scan start signal input to the fourth node (N4) from being discharged due to the first node (N1).

At a point in time (e.g., point in time B9) at which change from the high frame rate driving region to the low frame rate driving region is made, the scan control signal (OE) may have the logic low level in the section immediately preceding the high frame rate driving region, thereby blocking the scan signal (SL[n−1]) of the previous stage from being input to a stage of the low frame rate driving region.

Therefore, in the low frame rate driving region, the image data (DATA) may be held again to reduce power consumption.

Meanwhile, the scan unit 200 may include a Q node connected to the fourth node (N4) through at least one scan transistor.

The Q node may be reset using at least one of the second memory transistor (MM2) and the third memory transistor (MM3).

At a point in time (e.g., point in time B9) at which change from the high frame rate driving region to the low frame rate driving region is made, the Q node of the scan unit 200 needs to be reset.

For example, the Q node needs to be reset in a stage immediately before being driven at a high frame rate.

Here, since the scan control signal (OE) has the logic low level, the third memory transistor (MM3) may be turned off. Therefore, the Q node may be reset by being connected to the second node (N2) through the second memory transistor (MM2).

As described above, the scan driver according to the present invention may control the programming mode and the selective scan driving mode in the memory unit 100 such that a display region driven at a high frame rate may update the image data (DATA) a display region driven at a low frame rate may maintain the image data (DATA).

Therefore, the scan driver may reduce power consumed by a display device by minimizing unnecessary update of the image data (DATA).

Also, the scan driver may minimize a circuit area for reducing power consumption by providing the memory unit 100 to an input terminal of the scan unit 200 rather than an output terminal of the scan unit 200.

Figure 5:
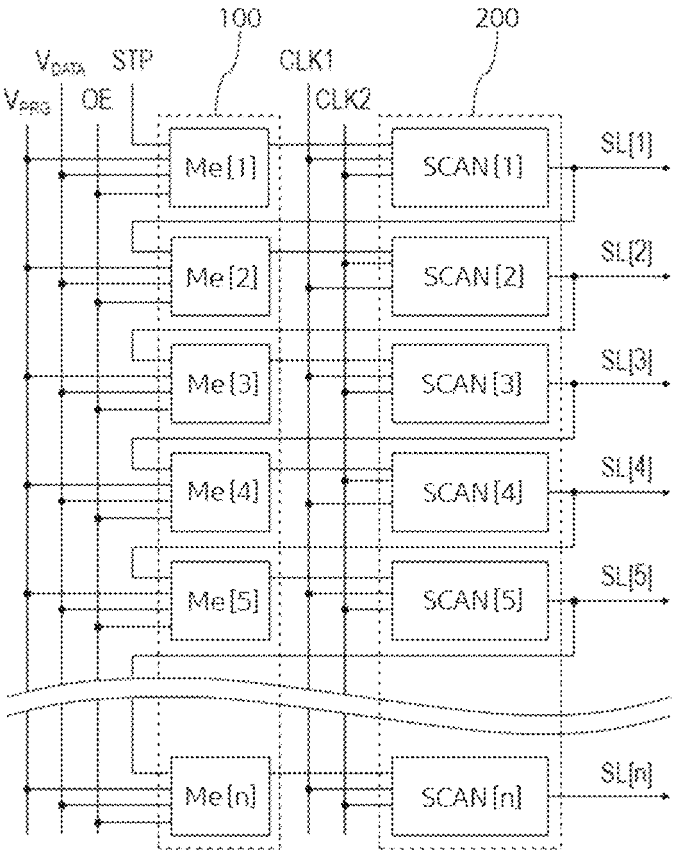
FIG. 5 is a block diagram illustrating a configuration of a scan driver according to another example embodiment of the present invention.
Figure 6:
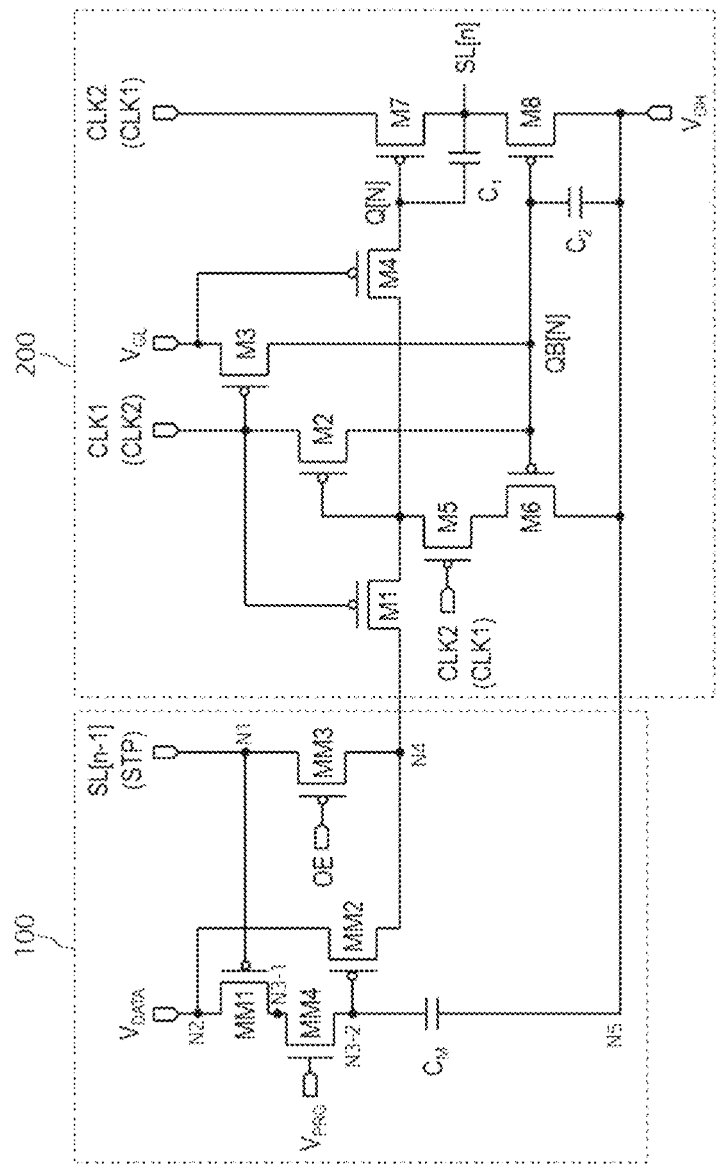
FIG. 6 is a circuit diagram illustrating a memory unit and a scan unit included in each stage of the scan driver of FIG. 5.
Figure 7:
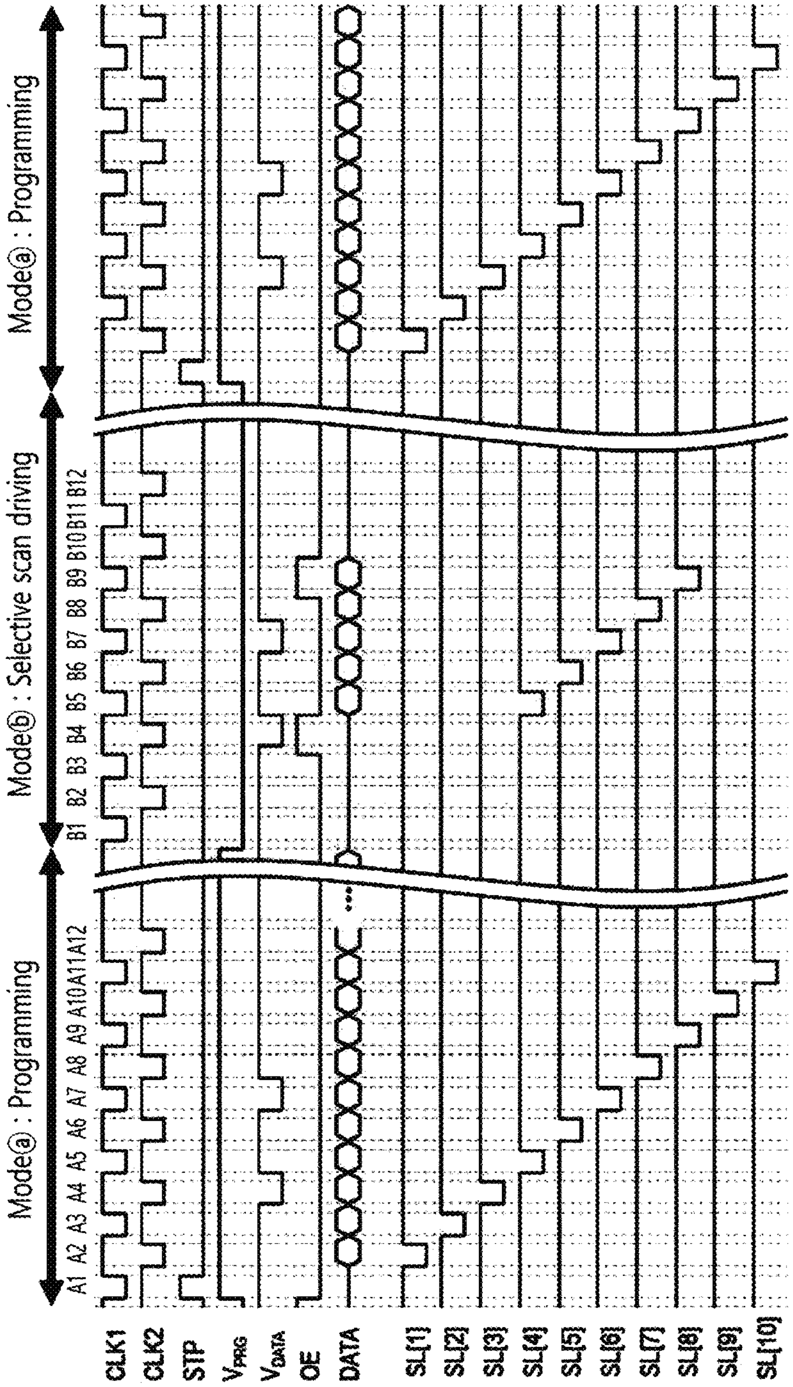
FIG. 7 is a timing diagram for describing an operation of the scan driver of FIG. 5.

FIG. 5 is a block diagram illustrating a configuration of a scan driver according to another example embodiment of the present invention, FIG. 6 is a circuit diagram illustrating the memory unit 100 and the scan unit 200 included in each stage of the scan driver of FIG. 5, and FIG. 7 is a timing diagram for describing an operation of the scan driver of FIG. 5. FIG. 6 illustrates a scan driver configured as a P-type.

Referring to FIGS. 5 to 7, the memory unit 100 may include a first memory transistor (MM1), a second memory transistor (MM2), a third memory transistor (MM3), a fourth memory transistor (MM4), and a memory capacitor.

In an example embodiment, the first memory transistor (MM1), the second memory transistor (MM2), and the third memory transistor (MM3) may be p-MOS transistors, and the fourth memory transistor (MM4) may be an n-MOS transistor.

The first memory transistor (MM1) may include a gate electrode connected to a first node (N1) to which the start signal (STP or SL[n−1]) is applied, a source electrode connected to a second node (N2) to which the data voltage (VDATA) is applied, and a drain electrode connected to a (3-1)-th node (N3-1).

The second memory transistor (MM2) may include a gate electrode connected to a (3-2)-th node (N3-2), a source electrode connected to the second node (N2), and a drain electrode connected to a fourth node (N4).

The third memory transistor (MM3) may include a gate electrode to which the scan control signal (OE) is applied, a source electrode connected to the first node (N1), and a drain electrode connected to the fourth node (N4).

The fourth memory transistor (MM4) may include a gate electrode to which a memory control signal (VPRG) is applied, a source electrode connected to the (3-1)-th node (N3-1), and a drain electrode connected to the (3-2)-th node.

The memory capacitor may include a first electrode connected to the (3-2)-th node (N3-2) and a second electrode connected to a fifth node (N5) to which a low level voltage of the scan unit 200 is applied.

When the selective scan driving mode continues for more than a certain period of time, leakage current may occur in a memory node.

For example, in the selective scan driving mode, a voltage level of the data voltage (VDATA) written to the (3-2)-th node (N3-2) (memory node) may be lowered.

The memory control signal (VPRG) may maintain the data voltage (VDATA) written to the (3-2)-th node (N3-2) at a constant level by controlling the fourth memory transistor (MM4) in the selective scan driving mode.

For example, the memory control signal (VPRG) may turn on the fourth memory transistor (MM4) by maintaining at the logic high level in the programming mode. The memory control signal (VPRG) may control the fourth memory transistor (MM4) by changing a logic level in the selective scan driving mode.

Therefore, although the selective scan driving mode continues for more than a certain period of time, a voltage level of the data voltage (VDATA) may be prevented from lowering in the memory node.

Figure 8:
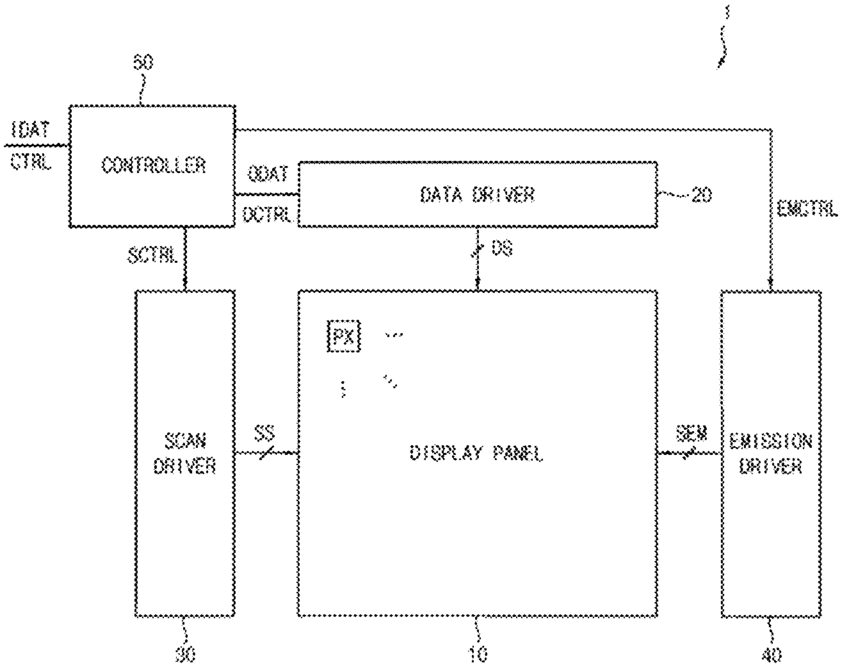
FIG. 8 is a block diagram illustrating a display device including a scan driver according to example embodiments of the present invention.

FIG. 8 is a block diagram illustrating a display device 1 including a scan driver 30 according to example embodiments of the present invention.

Referring to FIG. 8, the display device 1 according to example embodiments of the present invention may include a display panel 10 that includes a plurality of pixel rows, a data driver 20 configured to provide data signals to each of the plurality of pixel rows, the scan driver 30 configured to provide the plurality of scan signals to the plurality of pixel rows, respectively, and a controller 50 configured to control the data driver 20 and the scan driver 30. In an example embodiment, display device 1 may further include an emission driver 40 configured to provide emission signals (SEM) to the plurality of pixel rows.

The display panel 10 may include a plurality of scan lines, a plurality of data lines, and the plurality of pixel rows connected to the plurality of scan lines, respectively. Here, each pixel row may represent pixels (PX) of a single row connected to a single scan wire.

In an example embodiment, each pixel (PX) may include at least one capacitor, at least two transistors, and an organic light emitting diode (OLED), and the display panel 10 may be an OLED display panel 10.

The data driver 20 may generate data signals (DS) based on a data control signal (DCTRL) and output image data (ODAT) received from the controller 50 and may provide the data signals (DS) to the plurality of pixel rows through the plurality of data lines.

In an example embodiment, the data control signal (DCTRL) may include an output data enable signal, a horizontal start signal, and a load signal, but is not limited thereto.

In an example embodiment, the data driver 20 and the controller 50 may be implemented as a single integrated circuit, and the integrated circuit may be called a timing controller 50 embedded data driver 20 (TED). In another example embodiment, the data driver 20 and the controller 50 may be implemented as separate integrated circuits, respectively.

The scan driver 30 may generate a plurality of scan signals (SS) based on a scan control signal (SCTRL) received from the controller 50 and may provide the plurality of scan signals (SS) to the plurality of pixel rows through the plurality of scan lines.

In an example embodiment, the scan control signal (SCTRL) may include a start signal (STP or SL[n−1]), a first clock signal (CLK1), a second clock signal (CLK2) and a masking signal (MS), but is not limited thereto.

In an example embodiment, the scan driver 30 may be integrated or formed in the periphery of the display panel 10. In another example embodiment, the scan driver 30 may be implemented as one or more integrated circuits.

In an example embodiment, the scan driver 30 may include a plurality of stages. Each stage may include a scan unit including a plurality of scan transistors and configured to output a scan signal of driving a scan line using the plurality of scan transistors; and a memory unit configured to receive a start signal, a data voltage, and a scan control signal, and to selectively output at least one of the start signal and the data voltage to the scan unit as a scan start signal.

The memory unit may output the start signal to the scan unit as the scan start signal in a programming mode, and may output the data voltage to the scan unit as the scan start signal without outputting the start signal in a selective scan driving mode.

The scan driver 30 may control the programming mode and the selective scan driving mode in the memory unit such that a display region driven at a high frame rate may update image data (DATA) and a display region driven at a low frame rate may maintain the image data (DATA).

Therefore, the scan driver 30 may reduce power consumed by the display device 1 by minimizing unnecessary update of the image data (DATA).

Also, the scan driver 30 may minimize a circuit area for reducing power consumption by providing the memory unit to an input terminal of the scan unit rather than an output terminal of the scan unit.

The emission driver 40 may generate emission signals (SEM) based on an emission control signal (EMCTRL) received from the controller 50 and may provide the emission signals (SEM) to the plurality of pixel rows through a plurality of light emission lines.

In an example embodiment, the emission signals (SEM) may be sequentially provided to the plurality of pixel rows. In another example embodiment, the emission signals (SEM) may be global signals substantially simultaneously provided to the plurality of pixel rows.

In an example embodiment, the emission driver 40 may be integrated or formed in the periphery of the display panel 10. In another example embodiment, the emission driver 40 may be implemented as one or more integrated circuits.

The controller 50 (e.g., timing controller (T-CON)) may receive input image data (IDAT) and a control signal (CTRL) from an external host (e.g., graphic processing unit (GPU) or graphic card. In an example embodiment, the control signal (CTRL) may include a vertical synchronization signal, a horizontal synchronization signal, an input data enable signal, and a master clock signal, but is not limited thereto. The controller 50 may generate the output image data (ODAT), the data control signal (DCTRL), the scan control signal (SCTRL), and the emission control signal (EMCTRL) based on the input image data (IDAT) and the control signal (CTRL) and may provide the output image data (ODAT) and the data control signal (DCTRL) to the data driver 20 to control the data driver 20, may provide the scan control signal (SCTRL) to the scan driver 30 to control the scan driver 30, and may provide the emission control signal (EMCTRL) to the emission driver 40 to control the emission driver 40.

Figure 9:
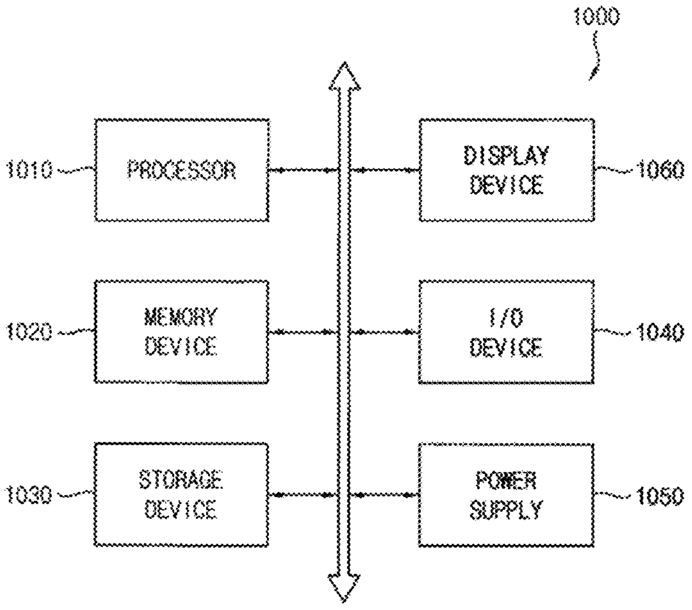
FIG. 9 is a block diagram illustrating an electronic device including the display device of FIG. 8.

FIG. 9 is a block diagram illustrating an electronic device including the display device of FIG. 8 according to the present invention.

Referring to FIG. 9, an electronic device 1000 may include a processor 1010, a memory device 1020, a storage device 1030, an input/output (I/O) device 1040, a power supply 1050, and a display device 1060. The electronic device 1000 may further include a plurality of ports capable of communicating with a video card, a sound card, a memory card, and a universal serial bus (USB) device, or communicating with other systems.

The processor 1010 may perform specific computation or tasks. Depending on example embodiments, the processor 1010 may be a microprocessor, a central processing unit (CPU), and the like. The processor 1010 may be connected to other components through an address bus, a control bus, and a data bus. Depending on example embodiments, the processor 1010 may also be connected to an expansion bus, such as a peripheral component interconnect (PCI) bus.

The memory device 1020 may store data required for an operation of the electronic device 1000. For example, the memory device 1020 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), and a ferroelectric random access memory (FRAM) and/or a volatile memory device such as a dynamic random access memory (DRAM), a static random access memory (SRAM), and a mobile DRAM.

The storage device 1030 may include a solid state drive (SSD), a hard disk drive (HDD), and a CD-ROM. The I/O device 1040 may include an input device such as a keyboard, a keypad, a touchpad, a touchscreen, and a mouse, and an output device such as a speaker and a printer. The power supply 1050 may supply power required for an operation of the electronic device 1000. The display device 1060 may be connected to other components through the buses or other communication links.

In the display device 1060, each stage of a scan driver may include a masking controller configured to output a masking signal as a scan signal in response to a carry signal. Therefore, the scan driver may provide a plurality of scan signals to a plurality of pixel rows at different driving frequencies and the display device 1060 may perform multi-frequency driving.

Depending on example embodiments, the electronic device 1000 may be, for example, a mobile phone, a smartphone, a tablet computer, a digital television (TV), a 3D TV, a virtual reality (VR) device, a personal computer (PC), a home electronic device, a laptop computer, a personal digital assistant (PDA), a portable multimedia player (PMP), a digital camera, a music player, a portable game console, a navigation, and any electronic device including the display device 1060.

What is claimed is:

1. A scan driver of a display device, the scan driver comprising:

a plurality of stages, wherein each stage comprises:

a scan unit comprising a plurality of scan transistors and configured to output a scan signal for driving a scan line using the plurality of scan transistors; and a memory unit configured to receive a start signal, a data voltage, and a scan control signal, and to selectively output at least one of the start signal and the data voltage to the scan unit as a scan start signal, wherein the start signal includes an initial start signal and a scan signal of a previous stage, wherein the memory unit is configured to output the start signal to the scan unit as the scan start signal in a programming mode, and to output the data voltage to the scan unit as the scan start signal without outputting the start signal in a selective scan driving mode, and wherein the memory unit comprises:

a first memory transistor comprising a gate electrode connected to a first node to which the start signal is applied, a source electrode connected to a second node to which the data voltage is applied, and a drain electrode connected to a third node;

a second memory transistor comprising a gate electrode connected to the third node, a source electrode connected to the second node, and a drain electrode connected to a fourth node; and a third memory transistor comprising a gate electrode to which the scan control signal is applied, a source electrode connected to the first node, and a drain electrode connected to the fourth node.

2. The scan driver of claim 1, wherein the scan unit is configured to receive the scan start signal through the fourth node.

3. The scan driver of claim 1, wherein the memory unit further comprises a memory capacitor comprising:

a first electrode connected to the third node, and a second electrode connected to a fifth node to which a low level voltage of the scan unit is applied.

4. The scan driver of claim 1, wherein the first memory transistor, the second memory transistor, and the third memory transistor are n-MOS transistors.

5. The scan driver of claim 1, wherein, in the programming mode, the start signal has a logic high level during a first period, the scan control signal is maintained at the logic high level, and image data is updated during all sections.

6. The scan driver of claim 1, wherein, in the selective scan driving mode, the start signal has a logic low level during all sections, and image data is held in a low frame rate driving region and updated in a high frame rate driving region.

7. The scan driver of claim 6, wherein, in the selective scan driving mode, the scan control signal has the logic low level in a section immediately preceding the high frame rate driving region and a last section of the high frame rate driving region.

8. The scan driver of claim 1, wherein the scan unit comprises a Q node connected to the fourth node through at least one scan transistor.

9. The scan driver of claim 8, wherein the Q node is reset using at least one of the second memory transistor and the third memory transistor.

10. A scan driver of a display device, the scan driver comprising:

a plurality of stages, wherein each stage comprises:

a scan unit comprising a plurality of scan transistors and configured to output a scan signal of driving a scan line using the plurality of scan transistors; and a memory unit configured to receive a start signal, a data voltage, and a scan control signal, and to selectively output at least one of the start signal and the data voltage to the scan unit as a scan start signal, wherein the start signal comprises an initial start signal and a scan signal of a previous stage, wherein the memory unit is configured to output the start signal to the scan unit as the scan start signal in a programming mode, and to output the data voltage to the scan unit as the scan start signal without outputting the start signal in a selective scan driving mode, and wherein the memory unit comprises:

a first memory transistor comprising a gate electrode connected to a first node to which the start signal is applied, a source electrode connected to a second node to which the data voltage is applied, and a drain electrode connected to a (3-1)-th node;

a second memory transistor comprising a gate electrode connected to a (3-2)-th node, a source electrode connected to the second node, and a drain electrode connected to a fourth node;

a third memory transistor comprising a gate electrode to which the scan control signal is applied, a source electrode connected to the first node, and a drain electrode connected to the fourth node; and a fourth memory transistor comprising a gate electrode to which a memory control signal is applied, a source electrode connected to the (3-1)-th node, and a drain electrode connected to the (3-2)-th node.

11. The scan driver of claim 10, wherein the memory unit further comprises a memory capacitor comprising a first electrode connected to the (3-2)-th node and a second electrode connected to a fifth node to which a low level voltage of the scan unit is applied.

12. The scan driver of claim 10, wherein the first memory transistor, the second memory transistor, and the third memory transistor are p-MOS transistors, and wherein the fourth memory transistor is an n-MOS transistor.

13. The scan driver of claim 10, wherein the memory control signal turns on the fourth memory transistor by maintaining at a logic high level in the programming mode and controls the fourth memory transistor by changing a logic level in the selective scan driving mode.

14. A display device comprising:

a display panel comprising a plurality of pixel rows;

a data driver configured to provide data signals to each of the plurality of pixel rows;

a scan driver configured to provide a plurality of scan signals to the plurality of pixel rows, respectively; and a controller configured to control the data driver and the scan driver, the scan driver comprises a plurality of stages, each stage comprises:

a scan unit comprising a plurality of scan transistors and configured to output a scan signal of driving a scan line using the plurality of scan transistors; and a memory unit configured to receive a start signal, a data voltage, and a scan control signal, and to selectively output at least one of the start signal and the data voltage to the scan unit as a scan start signal, wherein the start signal comprises an initial start signal and a scan signal of a previous stage, wherein the memory unit is configured to output the start signal to the scan unit as the scan start signal in a programming mode, and to output the data voltage to the scan unit as the scan start signal without outputting the start signal in a selective scan driving mode, and wherein the memory unit comprises:

a first memory transistor comprising a gate electrode connected to a first node to which the start signal is applied, a source electrode connected to a second node to which the data voltage is applied, and a drain electrode connected to a third node;

a second memory transistor comprising a gate electrode connected to the third node, a source electrode connected to the second node, and a drain electrode connected to a fourth node; and a third memory transistor comprising a gate electrode to which the scan control signal is applied, a source electrode connected to the first node, and a drain electrode connected to the fourth node.

* * * * *